US007750090B2

(12) United States Patent
Sellergren et al.

(10) Patent No.: US 7,750,090 B2
(45) Date of Patent: Jul. 6, 2010

(54) MOLECULARY IMPRINTED POLYMERS FOR EXTRACTION OF COMPONENTS FROM FOODSTRUFFS

(75) Inventors: Börje Sellergren, Helsingborg (SE); Panagiotis Manesiotis, Dortmund (DE); Andrew J Hall, Dortmund (DE)

(73) Assignee: MIP Technologies AB, Lund (SE)

( * ) Notice: Subject to any disclaimer, the term of this patent is extended or adjusted under 35 U.S.C. 154(b) by 1072 days.

(21) Appl. No.: 10/543,775

(22) PCT Filed: Jan. 29, 2004

(86) PCT No.: PCT/SE2004/000114

§ 371 (c)(1), (2), (4) Date: May 30, 2006

(87) PCT Pub. No.: WO2004/067578

PCT Pub. Date: Aug. 12, 2004

(65) Prior Publication Data

US 2006/0292545 A1 Dec. 28, 2006

(30) Foreign Application Priority Data

Jan. 30, 2003 (SE) .................................... 0300244

(51) Int. Cl.
*C08F 8/12* (2006.01)
*C08F 26/06* (2006.01)

(52) U.S. Cl. .................... 525/378; 525/326.7; 526/204; 526/258; 526/264; 526/265; 526/303.1; 526/306; 526/319; 526/323.2

(58) Field of Classification Search ................. 526/204, 526/258, 264, 265, 303.1, 306, 319, 323.2; 525/326.7, 378
See application file for complete search history.

(56) References Cited

U.S. PATENT DOCUMENTS 5,728,296 A 3/1998 Hjerten et al.
6,255,461 B1 7/2001 Mosbach et al.
6,322,834 B1 11/2001 Leone
6,379,599 B1 * 4/2002 Vaidya et al. ............... 264/220
6,391,359 B2 5/2002 Leone
6,749,811 B2 * 6/2004 Murray ........................ 422/91
6,759,488 B1 * 7/2004 Sellergren et al. ............. 526/67
6,870,021 B2 * 3/2005 Sellergren et al. ........... 526/302
2002/0012727 A1 1/2002 Leone

FOREIGN PATENT DOCUMENTS

WO WO 0130856 5/2001
WO WO 0155095 8/2001
WO WO 0161354 1/2002
WO WO 0201223 1/2002

OTHER PUBLICATIONS

Hall et al. Mat. Res. Soc. Symp. Proc.,2002, 723, M1.3.1-M1.3.5.*
Australian Patent Office Action dated Jan. 21, 2009 from corresponding AU Application No. 2004207135.
Polymer Peprints, vol. 41, No. 2, 2000, Ken D. Shimizu et al:, "Coupling the Affinity Spectrum Method with Selective Chemical Post-Modification for the Improvement of Imprinted Polymers", pp. 1577-1578.
Analytica Chimica Acta, vol. 435, 2001, Jesper G. Karlsson et al: "Probing the molecular basis for ligand-selective recognition in molecularly imprinted polymers selective for the local anasthetic bupivacine" pp. 57-64.
Journal of Chromatography A, vol. 975, 2002, Anders Blomgren et al:, "Extraction of clenbuterol from calf urine using a molecularly imprinted polymer followed by quantitation by high-performance liqid chromatography with UV detection", pp. 157-164.
Journal of Chromatography A, vol. 753, 1996, Christian Dauwe et al: "Influence of template basicity and hydrophobicity on the molecular recognition properties of molecularly imprinted polymers", pp. 191-200.
J. Am. Chem. Soc vol. 125, 2003, Beate Dirion et al: "Water-Compatible Molecularly Imprinted Polymers Obtained via High-Throughtput, Synthesis and Expermental Design" pp. 15101-15109.

* cited by examiner

*Primary Examiner*—Helen L. Pezzuto
(74) *Attorney, Agent, or Firm*—Young & Thompson

(57) ABSTRACT

The present invention relates to a novel class of water compatible molecularly imprinted polymers (AquaMIPs) capable of selectively binding target molecules such as riboflavin, or analogues thereof, in water or aqueous media, their synthesis and use thereof in food processing and extraction or separation processes.

12 Claims, 8 Drawing Sheets

Figure 2:
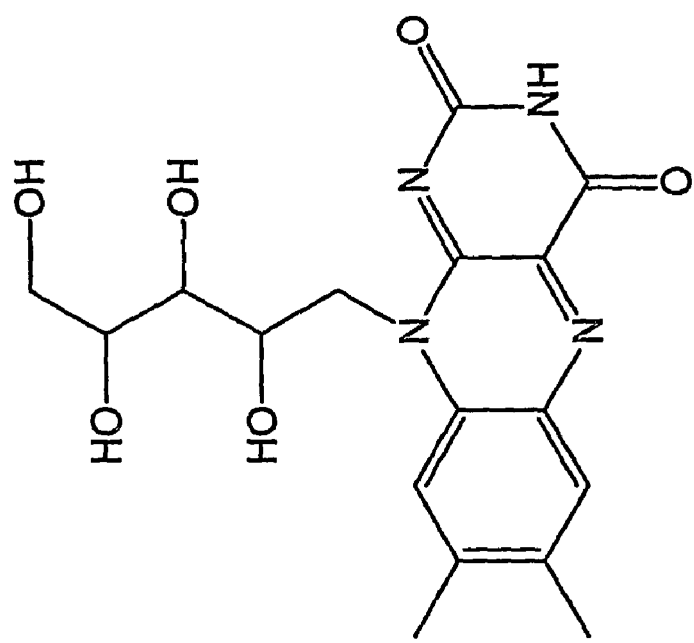
Figure 2:
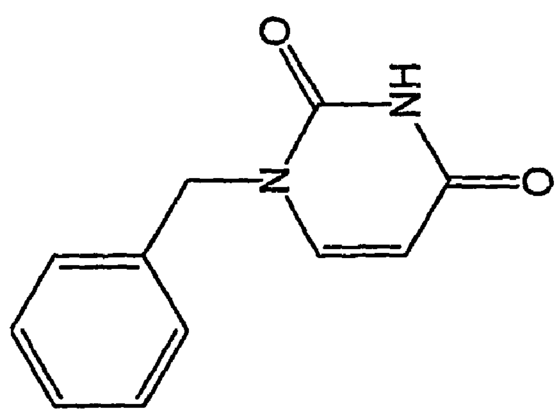
Figure 2:
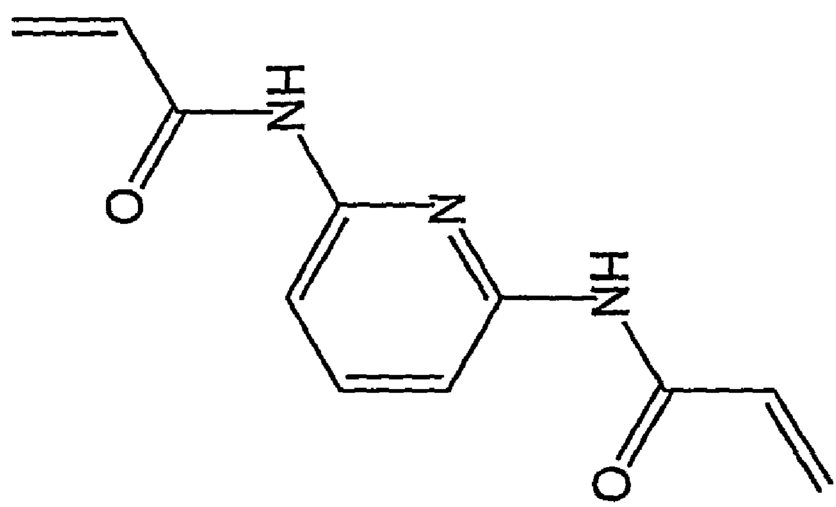
Figure 2:
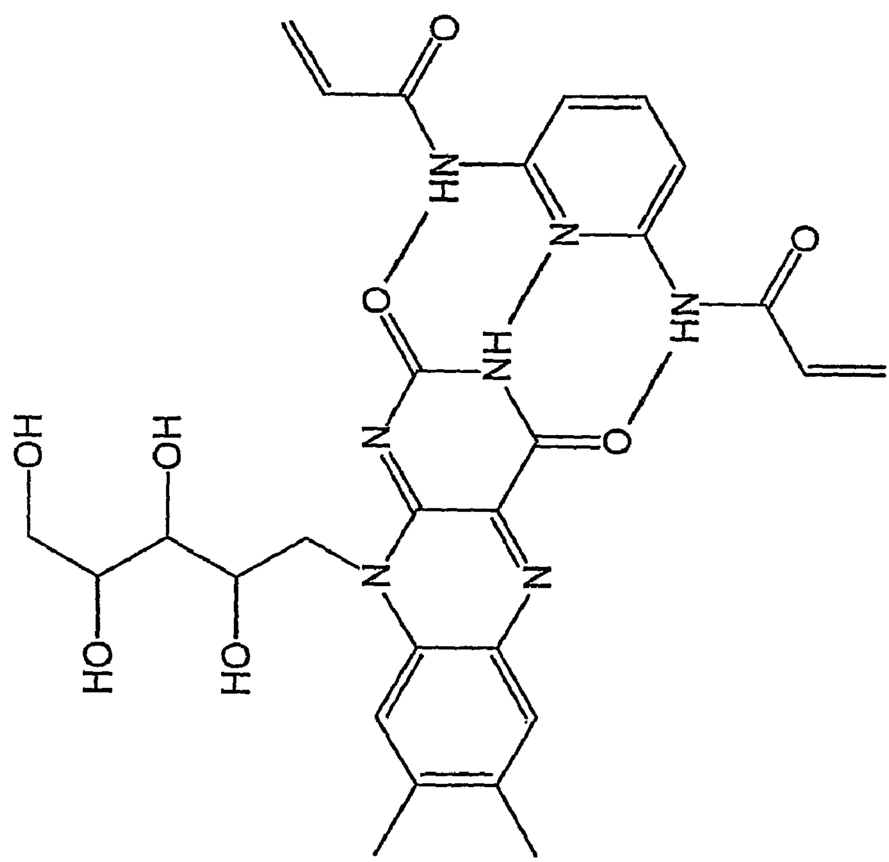

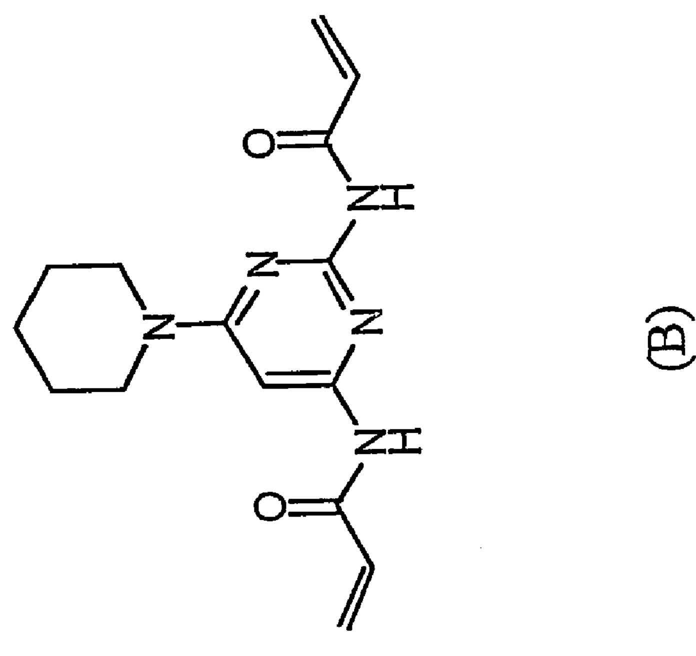
Fig. 2 (c)
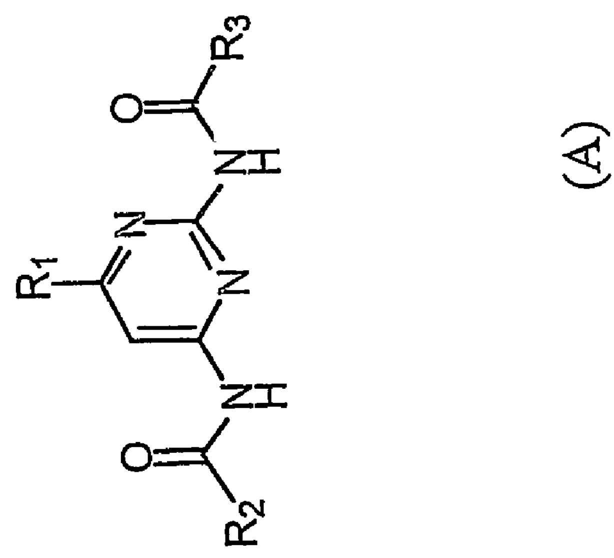

PETRA

PETRA chloroacetate

MOLECULARY IMPRINTED POLYMERS FOR EXTRACTION OF COMPONENTS FROM FOODSTRUFFS

FIELD OF THE INVENTION

The present invention relates to a novel class of water compatible molecularly imprinted polymers (AquaMIPs) capable of selectively binding target molecules, such as riboflavin or analogues thereof, in water or aqueous media, their synthesis and use thereof in food processing and extraction or separation processes.

BACKGROUND OF THE INVENTION

In the fields of medical, dietary, environmental and chemical sciences, there is an increasing need for the selective separation of specific substances from complex mixtures of related substances. The goals vary; it may be the preparative isolation of one or more specific compounds, or measurement of their concentration, or the selective removal of a target compound from a multi-component mixture.

Riboflavin (vitamin $B_2$), a water soluble vitamin, is essential for human diet being a major, component of flavin adenine dinucleotide (FAD) and flavin mononucleotide (FMN), the co-enzymes responsible for redox reactions. It is found in liver (3.5 mg/100 g), cheese (0.5 mg/100 g), milk (0.15 mg/100 g) and in beer (ca. 200 μg/L). While riboflavin is relatively stable towards heat and acidic pH, it decomposes in the presence of alkalis and light to lumiflavin, a stronger oxidative agent which contributes to the decomposition of vitamin C. The photoreduction of riboflavin is responsible for the break-down of the bitter iso-alpha acids in the presence of a sulphur source, which leads to the well-known "sun-struck" flavour of white wine, champagne, milk and beer which have been exposed to sunlight. In order to prevent the development of such undesired flavours, these products are preferably stored in bottles that are dark and non-transparent to light in the case of beer and wine, or, in plastic/paper packaging, in the case of milk. These measures would not be necessary for products lacking riboflavin.

Methods to selectively remove riboflavin from complicated matrices without otherwise affecting their composition are therefore of interest. The use of riboflavin binding protein in an affinity separation mode was suggested by M. G. Duyvis, et al., J. Agric. Food. Chem. 2002, Vol. 50, pp. 1548-1552, and by C. Laane, et al., J. Inst. Brew. 1999, Vol. 105, p. 392. However, the procedures suggested were strongly limited by issues related to stability and cost, which severely reduced the feasibility of these procedures.

Instead the use of stable polymeric materials capable of removing riboflavin from complicated matrices without otherwise affecting their composition may be more useful in this regard. Materials able to show such properties may thus find important applications in enhancing the stability and quality of relevant food and drink products. Moreover, such materials may be used to enrich and isolate flavins from complicated matrices prior to analytical quantification, or, as recognition elements in chemical sensors.

One such class of materials is the class known as "molecularly imprinted polymers (MIPs)", which may be prepared using the technique of molecular imprinting.

The most widely used protocol for the preparation of molecularly imprinted polymers (MIPs) (hereafter referred to as "the conventional technique or procedure") entails the following key steps:

(i) The target or template molecule, or else a structural analogue of it ("T"), is allowed to contact and interact with, the selected functional monomer ("M") in an aprotic solvent of low polarity, to form template-monomer assemblies which are noncovalently associated, (ii) The template-monomer assemblies are copolymerised with a cross-linking agent or monomer ("M-M") resulting in a cross-linked porous network polymer (also known as polymer matrix), (iii) The target or template ("T") is extracted from the polymer matrix, leaving the resulting MIP possessing the corresponding binding sites.

These binding sites on the MIP are capable of selectively re-binding the corresponding target or template molecule, or a close structural analogue, with high affinity and selectivity. Often the binding selectivities of these sites can be compared with the antibody-antigen complementarity.

In the conventional technique described above, the MIP is typically crushed and sieved prior to step (iii) (extraction of the template), to obtain a desired size fraction of particulate material. These can then be packed into a chromatographic column and used for chromatographic separation of the template from other components of a mixture with similar structure or functionality. Analytical as well as preparative applications are possible. In preparative applications, the purpose may be to isolate or to remove a particular compound. This may be performed, for example, through an affinity chromatographic procedure where either pH, ion strength or solvent gradients, or a combination of said parameters, may be used in order to control the strength of interaction with the stationary phase. The crude mixture is typically allowed to pass through a packed bed of the MIP whereby the compound to be removed or isolated is selectively retained on the MIP. Subsequently, the compound is released from the MIP in a regeneration step. After a conditioning step, the MIP is ready for reuse.

The use of MIPs in membrane format is yet an alternative, which may offer benefits by allowing faster separations and the possibility for continuous production of pure compounds.

Alternatively, separation may be performed in a so-called "batch format" where the MIP is suspended in the crude mixture for a time period considered sufficient for selective adsorption of the compound to occur. The regeneration can thereafter be performed as described above.

MIPs show promise in chiral separations of, for example, amino acid derivatives, peptides, phosphonates, aminoalcohols including beta-blocking compounds, and a number of chiral drugs.

Furthermore, promising developments involving MIPs are seen in affinity chromatography (See for ex., Y. Yu, et al., Biotechnology and Bioengineering 2002, Vol. 79, pp. 23-28), in chemical sensing (See for ex., K. Haupt, et al., Chem. Rev. 2000, Vol. 100, pp. 2495-2504) and as substitutes for antibodies in immunoassays of small target analytes (See for ex., L. Ye, et al., J. Am. Chem. Soc. 2001, Vol. 123, pp. 2901-2902). The patent literature reveals that the materials may find commercial use in all of these mentioned applications.

The polymerization process in the conventional procedure is performed in the presence of a pore-forming solvent called a porogen. In order to stabilize electrostatic interactions between the functional monomers and the template, the porogen selected is often an aprotic solvent possessing low to moderate polarity. The majority of templates used at the present time exhibit moderate to high solubility in such solvents (hereafter known as "conventional solvents"), and these or their structural analogues can therefore be imprinted using the conventional procedure.

On the other hand, the conventional procedure described above is not possible for hydrophilic targets or templates, which includes the majority of biologically interesting molecules. For this class of target or template molecules, the present imprinting techniques are associated with two major problems.

The first problem relates to the limited solubility of such targets in the conventional solvents.

Riboflavin, or analogues thereof (for example, FAD, FMN), belongs to the class of water-soluble vitamins and exhibits minimal to zero solubility in the low to non-polar, organic solvents typically used in the technique of molecular imprinting. It is therefore not possible to use riboflavin itself as a template in the conventional MIP synthesis techniques.

The second problem relates to the occurrence of non-specific hydrophobic binding when MIPs produced using conventional techniques are used as sorbents in water. Due to the hydrophobic nature of the matrix monomer, most targets adsorb nonspecifically to the polymer surface when the materials are used in pure aqueous media.

Measures to suppress this non-specific binding must thus be found. In order to obtain MIP sorbents capable of strongly and specifically adsorbing or binding hydrophilic biomolecules, e.g. riboflavin, or analogues thereof, from water rich media, approaches which lead to (1) imprinted sites capable of binding the target or template molecule in water and (2) suppression of non-specific binding, must be found.

To achieve imprinted sites capable of binding the template in water, a riboflavin analogue satisfying the following criteria, i.e., (a) is soluble in conventional solvents, (b) is stable under polymerisation conditions, (c) has close structural and shape analogy with riboflavin resulting in an imprinted site capable of accommodating riboflavin in aqueous media, may be used as a template.

SUMMARY OF THE INVENTION

The present invention thus relates to novel water compatible molecularly imprinted polymers ("AquaMIPs") capable of selectively binding target molecules in water or aqueous media.

The invention further relates to novel AquaMIPs capable of selectively binding targets in water or aqueous media, obtainable by the method comprising the steps:

(a) providing a selected structural analogue of the target or template, (b) providing one or more selected functional monomer(s) and one or more selected crosslinking agents, in a suitable polymerisation medium or solvent containing a selected free radical initiator, (c) co-polymerising said functional monomer(s) and said crosslinking agent(s) in the presence of said target or template analogue in said polymerisation medium, (d) removing said template analogue by solvent extraction or by photochemical means, (e) obtaining a molecularly imprinted polymer (AquaMIP), (f) optionally post-modifying ("hydrophilizing") said AquaMIP in order to reduce the non-specific hydrophobic binding.

In a specific case, the invention provides AquaMIPs for the molecular recognition and binding of imides, or imide-containing compounds, such as benzyluracil, riboflavin or analogues thereof. Such AquaMIPs designed to bind riboflavin are thus capable of selectively binding riboflavin under aqueous conditions such as those prevalent in liquid food and beverages, for example, beer.

Also, in this specific case, the invention provides novel molecularly imprinted polymers capable of binding imides, or imide-containing compounds, such as benzyluracil, riboflavin or analogues thereof in water or aqueous media obtainable by the method comprising the steps:

(a) providing a selected structural analogue of the imideor imide-containing target or template, (b) providing one or more selected functional monomer(s) and one or more selected crosslinking agents, in a suitable polymerisation medium or solvent containing a selected free radical initiator, (c) co-polymerising said functional monomer(s) and said crosslinking agent(s) in the presence of said imide or imide-containing template analogue in said polymerisation medium, (d) removing said imide or imide-containing template analogue by solvent extraction or photochemically, (e) obtaining a molecularly imprinted polymer (AquaMIP), (f) optionally post-modifying ("hydrophilizing") said AquaMIP in order to reduce the non-specific hydrophobic binding.

In a further aspect, the invention provides AquaMIPs capable of binding riboflavin and its derivatives in water or aqueous media obtained using structural analogues of riboflavin. These include, for example, riboflavin tetra-carboxylic acid esters, which may be synthesized via simple, one-step, esterification reactions of the sugar hydroxyl groups with alkanoic acid anhydrides.

The invention also provides AquaMIPs using functional monomers containing a donor-acceptor-donor (DAD) hydrogen bond motif, which is defined herein to include pyridine- and pyrimidine-based monomers. Some examples are 2,6-bis (acrylamido)-pyridine (BAAPy), or class of pyrimidine-based monomers such as 2,4-bis(acrylamido)pyrimidines, which exhibit strong binding to imides. These monomers are based on 6-substituted 2,4-bis(amido)pyrimidines of the general structure shown in FIG. 2C(A) (where $R_1$ may be any group, but preferably "—$NC_5H_{10}$", $R_2$ and $R_3$ may be any group but preferably "—CH═$CH_2$". One example is 2,4-bis (acrylamido)-6-piperidino-pyrimidine, shown in FIG. 2C(B). Another example is 2,4-bis(methacrylamido)-6-piperidino-pyrimidine (where $R_1$ may be any group, but preferably=—$NC_5H_{10}$; $R_2$ and $R_3$ may be any group, but preferably "—$C(CH_3)$═$CH_2$"

In yet another aspect, the invention relates to two different methods used to suppress non-specific binding.

The first is a procedure based on the addition of a hydrophilic comonomer, such as 2-hydroxyethylmethacrylate (HEMA), N-vinylpyrolidone, acrylamide, methacrylamide, glycerol-1-acrylate, or glycerol-1-methacrylate, to the monomer mixture. Alternatively, the procedure may also employ the addition of a hydrolysable crosslinking monomer such as pentaerythritoltriacrylate(PETRA), methylenediacrylamide or ethylenedimethacrylamide, to the monomer mixture, also at the start of the polymerization/copolymerisation reaction. These hydrophilic monomers give rise to polar functional groups after hydrolysis and impart a more hydrophilic character to the polymer matrix leading to a reduction in the nonspecific hydrophobically driven binding.

The second method is a procedure for post-modification and thereby "hydrophilization" of the MIP surface after synthesis. This is based on the use of crosslinking or functional monomers containing hydrolysable functional groups, such as epoxide or ester groups. After polymerization of these moieties using the conventional procedure, the surface of the polymer can be post-treated by hydrolysing these groups, providing a hydrophilic surface. Using bulky hydrolyzing agents this method allows in particular a selective hydrophilisation of pores exceeding a given size; i.e., only the hydrolysable functional groups located within pores of a sufficiently large size are hydrolysed. This is illustrated schematically in FIG. 4. The method allows the binding sites to maintain a certain hydrophobic character in analogy with the situation found in biological receptors.

The invention also relates to the use of said AquaMIPs for the extraction of riboflavin or riboflavin derivatives from foodstuffs, and the use of the invention in food processing.

The invention further relates to the use of said AquaMIPs for preparative separations, in chromatography, for analytical sample pre-treatment, in chemical sensors, and as reactors for synthesis of bioactive compounds.

DESCRIPTION OF TEE DRAWINGS

Figure 1:
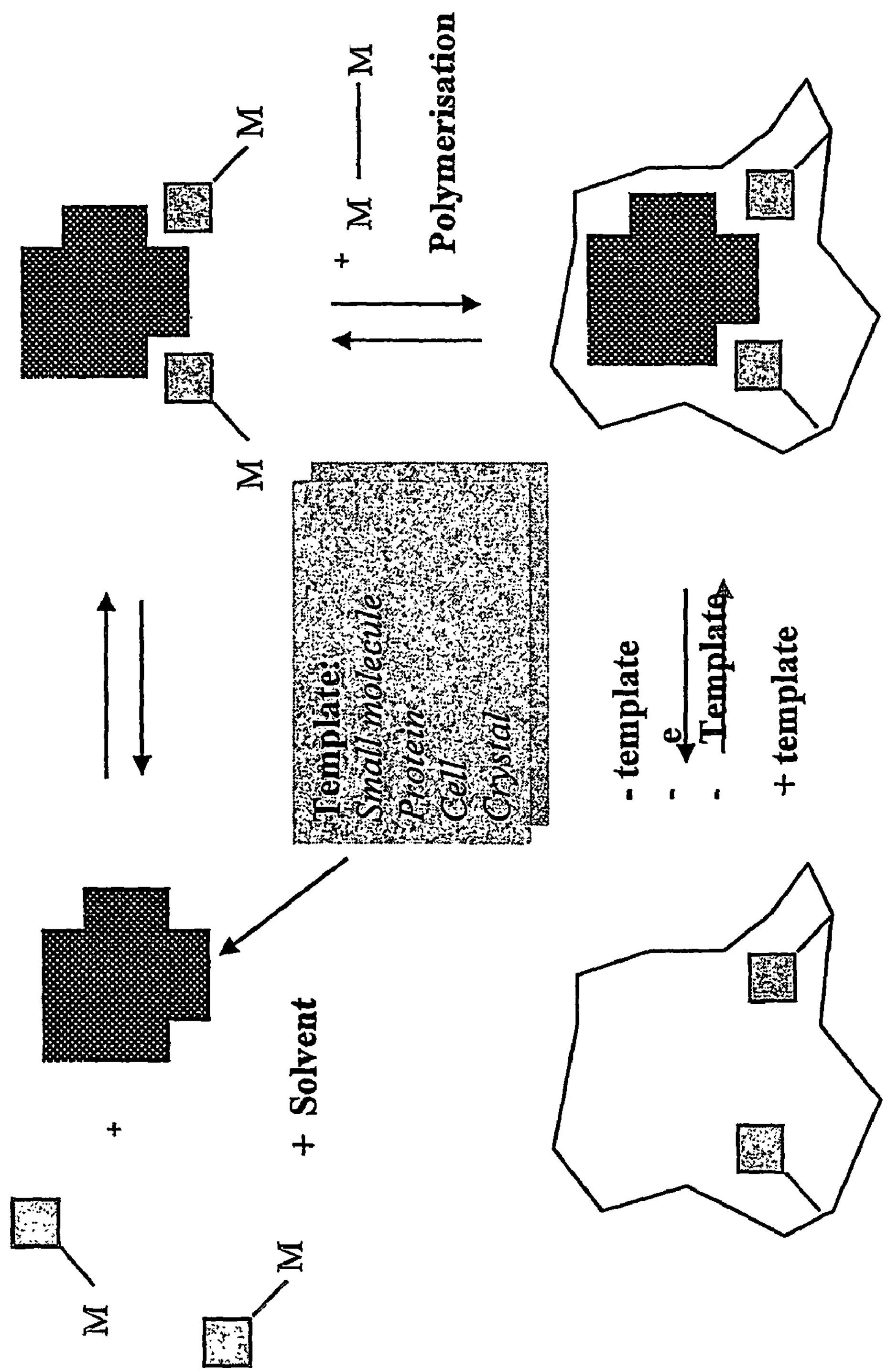

FIG. 1 illustrates schematically the principles behind molecular imprinting.

FIG. 2*a* presents the structures of 1-(benzyl)uracil and riboflavin for comparison.

FIG. 2*b* presents the structure of 2,6-bis(acrylamido)pyridine (BAAPy).

FIG. 2*c* presents (a) the general structure of 6-substituted 2,4-bis(amido)pyrimidine, and (b) the structure of 2,4-bis (acrylamido)-6-piperidinopyrimidine.

FIG. 2*d* presents the structure of a 1:1 complex between the functional monomer (BAAPy) and riboflavin.

Figure 3:
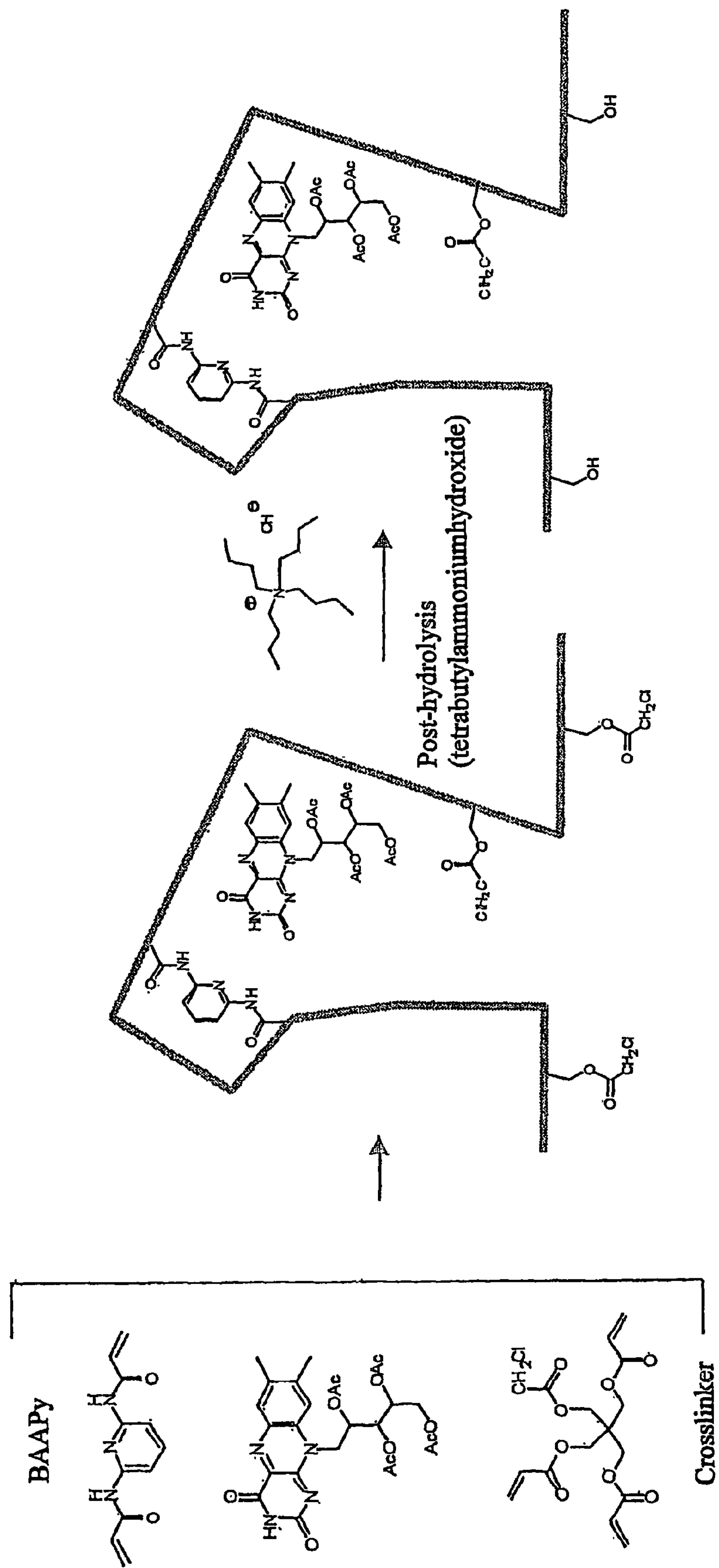

FIG. 3 presents the synthesis of an AquaMIP using riboflavin tetraacetate as template and BAAPy as functional monomer.

Figure 4:
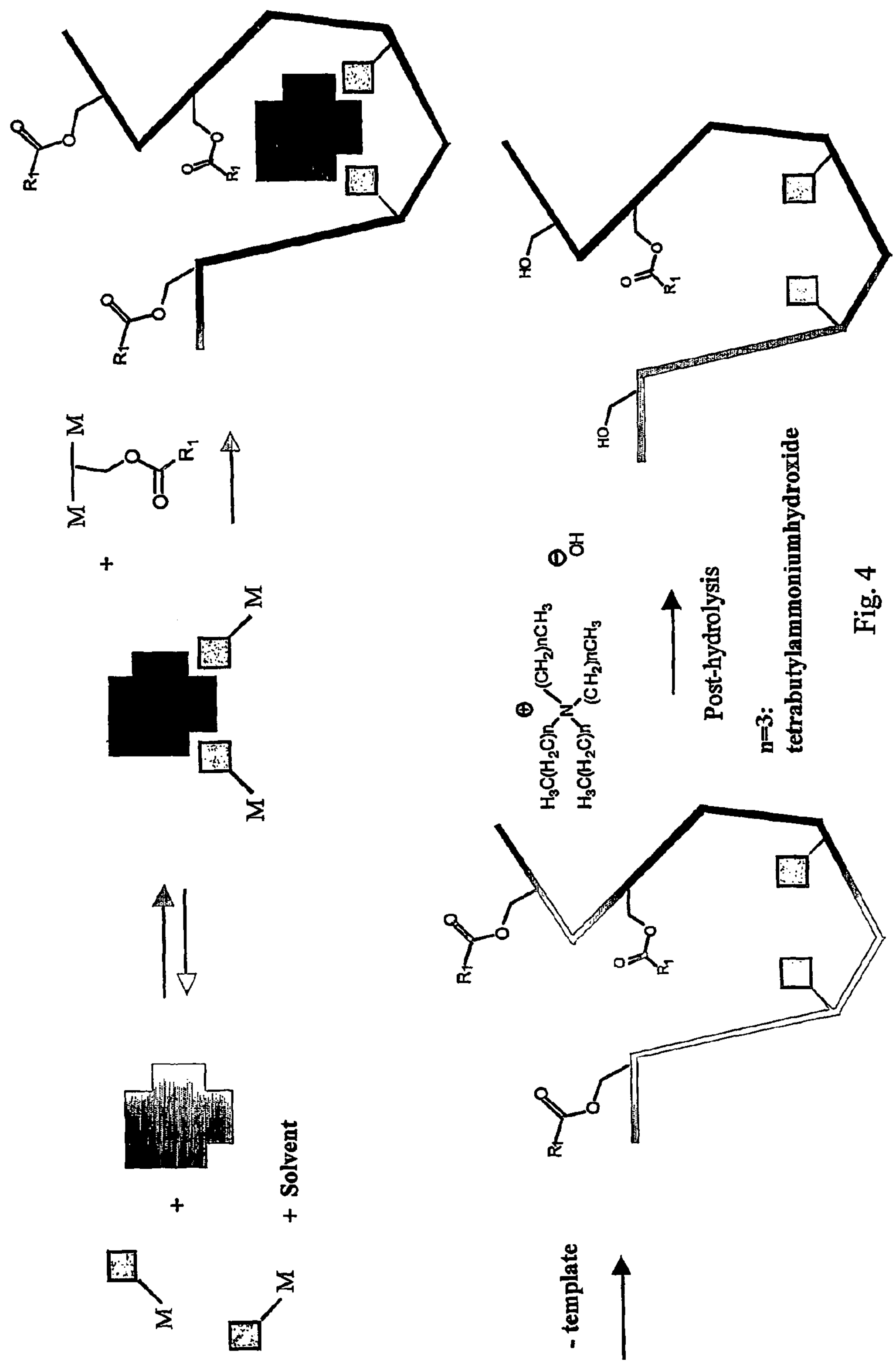

FIG. 4 presents the synthesis of a water compatible MIP (AquaMIP) and a strategy for pore size selective surface hydrophilization.

Figure 5:
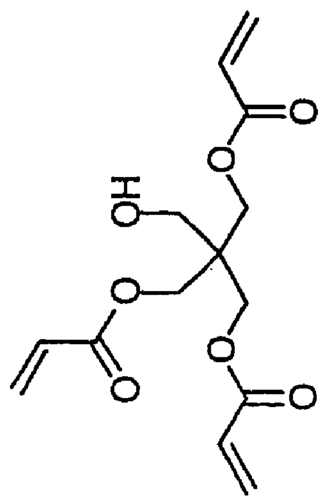
Figure 5:
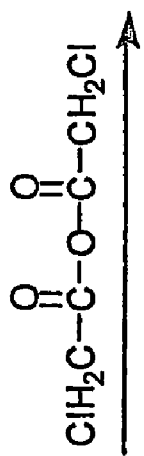
Figure 5:
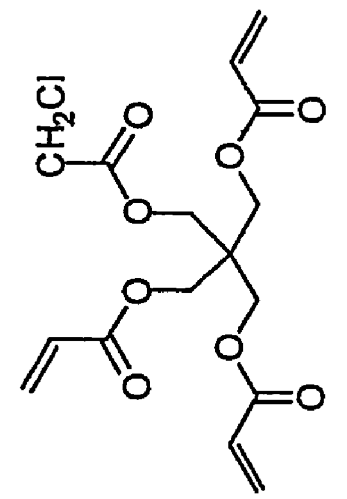

FIG. 5 presents the structure of possible hydrolysable crosslinking monomers based on PETRA

DETAILED DESCRIPTION OF THE INVENTION

Definitions

The term "target" as used herein is used interchangeably with "template".

The term "conventional procedure" as used herein refers to the most widely used protocol for the preparation of MIPs and is used interchangeably with the term "non-covalent method".

The term "conventional solvent" refers to the solvent(s) employed in the polymerization or copolymerization processes involved in the conventional procedure, which includes pore-forming solvents (porogens) and aprotic solvents possessing low to moderate polarity.

The term "conventional MIPs" as used herein refers to MIPs produced using conventional procedures.

The term "post-modification" or "hydrophilizing" or "hydrophilization" as used herein is used interchangeably and refers to the second method described for the suppression of non-specific binding. The method allows a selective hydrophilisation of pores over a given size, and allows the binding sites to maintain a certain hydrophobic character in analogy with the situation found in biological receptors. The method is schematically illustrated in FIG. 4.

The term "imide" as used herein refers to compounds in which two free valences of the group "═NH" are attached to acyl groups [as in "O═C—NH—C═O"], and as found in phthalimide. (from H. Benett, Ed., Concise Chemical and Technical Dictionary, Edward Arnold, Pub., U.K., 1986)

The term "functional monomers containing a donor-acceptor-donor (DAD) hydrogen motif" as used herein is intended as a generic term comprising pyridine and pyrimidine-based monomers, as described in the specification.

The term "hydrophilic monomers" as used herein is used interchangeably with the tem "hydrophilic comonomers" and is intended to include monomers such as 2-hydroxyethyl-methacrylate (HEMA), N-vinylpyrolidone, acrylamide, methacrylamide, glycerol-1-acrylate, or glycerol-1-methacrylate.

The term "hydrophilic crosslinking monomer" as used herein refers to monomers having three or more functional groups, allowing for a crosslinking reaction. Examples include hydrolysable crosslinking monomers such as pentaerythritoltriacrylate(PETRA), methylenediacrylamide or ethylenedimethacrylamide.

The term "crosslinking agent" is used herein interchangeably with the term "crosslinking monomer". A typical example of a crosslinking agent is EDMA (ethyleneglycoldimethacrylate).

Novel AquaMIPs

The present invention thus relates to novel water compatible molecularly imprinted polymers (AquaMIPs) capable of selectively binding target molecules in water or aqueous media.

The invention further relates to novel AquaMIPs capable of selectively binding targets in water or aqueous media, obtainable by the method comprising the steps:

(a) providing a selected structural analogue of the target or template, (b) providing one or more selected functional monomer(s) and one or more selected crosslinking agent(s), in a suitable polymerisation medium or solvent containing a selected free radical initiator, (c) co-polymerising said functional monomer(s) and said crosslinking agent(s) in the presence of said target or template analogue in said polymerisation medium, (d) removing said template analogue by solvent extraction or by photochemical means, (e) obtaining a molecularly imprinted polymer (AquaMIP), (f) optionally post-modifying ("hydrophilizing") said AquaMIP in order to reduce the non-specific hydrophobic binding.

This method is exemplified in Examples 4-8, and 10-12.

In one specific case, the invention provides AquaMIPs for the molecular recognition and binding of imides, or imide-containing compounds, such as benzyluracil, riboflavin or analogues thereof.

AquaMIPs designed to bind, for example, riboflavin, are thus capable of selectively binding riboflavin under aqueous conditions such as those prevalent in liquid food and beverages, for example, beer. These AquaMIPs exhibit strong affinity and selectivity for riboflavin in water and aqueous media.

Also, in this specific case, the invention provides novel molecularly imprinted polymers capable of binding imides, or imide-containing compounds, such as benzyluracil, riboflavin or analogues thereof in water or aqueous media obtainable by the method comprising the steps as given above for templates or targets, except that an imide or imide-containing analogue is used as the template in steps (a), (c), and (d). Thus, these steps of the method are:

(a) providing a selected structural analogue of the chosen imide or imide-containing target or template, (b) providing one or more selected functional monomer(s) and one or more selected crosslinking agent(s) in a suitable polymerisation medium or solvent containing a selected free radical initiator, (c) co-polymerising said functional monomer(s) and said crosslinking agent(s) in the presence of said imide or imide-containing target analogue in said polymerisation medium, (d) removing said imide or imide-containing target analogue by solvent extraction or photochemically, (e) obtaining a molecularly imprinted polymer (AquaMIP), (f) optionally post-modifying ("hydrophilizing") said AquaMIP in order to reduce the non-specific hydrophobic binding.

For the case of riboflavin as the imide or imide-containing target, the method is exemplified and described in detail in Examples 4 and 5.

To achieve imprinted sites capable of binding the template in water, a riboflavin analogue satisfying the following criteria, i.e., (a) is soluble in the conventional polymerisation medium or solvent, (b) is stable under polymerisation conditions, (c) has close structural and shape analogy with riboflavin resulting in an imprinted site capable of accommodating riboflavin in aqueous media, may be used as a template.

In this invention, the structural analogues of riboflavin used may include, for example, those having the form of riboflavin tetra-carboxylic acid esters which may be synthesised via simple, one-step, esterification reactions of the sugar hydroxyl groups with alkanoic acid anhydrides. Some examples are riboflavin acetic acid tetraesters, riboflavin propionic acid tetraesters and riboflavin formic acid tetraesters. The synthesis of riboflavin acetic acid tetraester and riboflavin propionic acid tetraester are described in detail in Examples 1 and 2 respectively.

The invention also provides AquaMIPs using functional monomers containing a donor-acceptor-donor (DAD) hydrogen bond motif, which is defined herein to include pyridine- and pyrimidine-based monomers. Some examples are 2,6-bis (acrylamido)-pyridine (BAAPy), or class of pyrimidine-based monomers such as 2,4-bis(acrylamido)pyrimidines, which exhibit strong binding to imides. These monomers are based on 6-substituted 2,4-bis(amido)pyrimidines of the general structure shown in FIG. 2C(A) (where $R_1$ may be any group, but preferably "—$NC_5H_{10}$", $R_2$ and $R_3$ may be any group but preferably "—CH=$CH_2$". One example is 2,4-bis (acrylamido)-6-piperidino-pyrimidine, shown in FIG. 2C(B). Another example is 2,4-bis(methacrylamido)-6-piperidino-pyrimidine (where $R_1$ may be any group, but preferably=—$NC_5H_{10}$; $R_2$ and $R_3$ may be any group, but preferably "—C($CH_3$)=$CH_2$".) The synthesis of functional monomers 2,4-bis(acrylamido)-6-piperidinopyrimidine and 2,4-bis (acrylamido)-4-ethoxypyrimidine is described in Example 3.

A typical free radial initiator used for the copolymerisation reactions is azobisisobutyronitrile (AIBN), though other suitable initiators may be used.

A typical crosslinking agent or monomer used for the copolymerisation reaction is (ethyleneglycoldimethacrylate (EDMA).

Thus, using a selection of the riboflavin analogues and functional monomers described above, novel AquaMIPs are synthesised according to the method described.

Methods to Suppress Non-Specific Binding

In yet another aspect, the invention relates to two different methods used to suppress non-specific binding. The invention thus provides AquaMIPs capable of suppressing non-specific binding to the imprinted polymers.

The first is a procedure based on the addition of a hydrophilic comonomer, such as 2-hydroxyethylmethacrylate (HEMA), N-vinylpyrolidone, acrylamide, methacrylamide, glycerol-1-acrylate, or glycerol-1-methacrylate, to the monomer mixture. Alternatively, the procedure may also employ the addition of a hydrolysable crosslinking monomer such as pentaerythritoltriacrylate(PETRA), methylenediacrylamide or ethylenedimethacrylamide, to the monomer mixture, also at the start of the polymerization/copolymerisation reaction. These hydrophilic monomers give rise to polar functional groups after hydrolysis and impart a more hydrophilic character to the polymer matrix leading to a reduction in the nonspecific hydrophobically driven binding.

The synthesis of these "special" AquaMIPs showing low non-specific binding is exemplified and described in detail in Examples 10-12.

The second method is a procedure for post-modification and thereby "hydrophilization" of the MIP surface after synthesis. This is based on the use of crosslinking or functional monomers containing hydrolysable functional groups, such as epoxide or ester groups. After polymerization of these moieties using the conventional procedure, the surface of the polymer can be post-treated by hydrolysing these groups, providing a hydrophilic surface. Using bulky hydrolyzing agents this method allows in particular a selective hydrophilisation of pores exceeding a given size; i.e., only the hydrolysable functional groups located within pores of a sufficiently large size are hydrolysed. This is illustrated schematically in FIG. 4. The method allows the binding sites to maintain a certain hydrophobic character in analogy with the situation found in biological receptors.

To illustrate this method further, a series of novel hydrolysable crosslinking monomers is first synthesized which are different in terms of leaving group ability of the acyl moiety. These can be mono- di- or tri-chloroacetates of PETRA as depicted in FIG. 5. The MIP is prepared using such a crosslinking agent by the conventional procedure whereafter the MIP is subjected to a pore-size selective hydrolysis step. This is performed using tetraalkylammonium hydroxide (QOH) where the size of the alkyl group is chosen in order for the QOH to be excluded from smaller pores too small for it to penetrate. In this way only the ester groups associated with the larger pores will be cleaved and the corresponding surface hydrophilized. This generic procedure may be applied to hydrophilize the surface of any MIP prepared using the conventional procedure or similar.

The AquaMIPs according to the invention may be used for the extraction of hydrophilic target or template molecules from food, and used in food processing applications. One specific case is the application to the extraction of riboflavin or riboflavin derivatives from food. Example 9 shows that the AquaMIPs according to the invention may be used to successfully extract riboflavin from beer. Another successful application of the MIP is substantiated and illustrated by the chromatographic extraction described in Example 8, where a riboflavin analogue, 1-(benzyl)uracil, is retained for a substantially longer period on an MIP synthesized using the method according to the invention.

The invention further relates to the use of said AquaMIPs for analytical sample pre-treatment, for preparative separations, in chromatographic techniques, membrane-based separations, batch format based separations, in chemical sensors, and as reactors for synthesis of bioactive compounds.

EXAMPLES

The invention will now be described in more detail with reference to a number of non-limiting examples.

A. Sythesis of Riboflavin Analogues (Ex. 1-2)

Example 1

Synthesis of Riboflavin Acetic Acid Tetraester 2.65 g (7 mmols) of riboflavin, 2.9 g (35 mmols) of sodium acetate and 50 mL of acetic acid anhydride are weighed into a 100 ml round-bottomed flask. The mixture appears as a bright orange suspension. The flask is heated in an oil bath at 80-90° C. until a deep orange-red solution is obtained. The clear solution is then poured into an Erlenmayer flask containing approximately 200 ml of ice. The mixture is then neutralised using solid sodium carbonate ($NaHCO_3$) and then extracted with 3×100 mL of chloroform ($CHCl_3$). The organic fractions are combined and dried over magnesium sulphate ($MgSO_4$). The solvent is then evaporated under vacuum and a bright orange solid is obtained. The crude product is reconstituted in minimum amount of methanol (MeOH) and then precipitated by addition of water.

Example 2

Synthesis of Riboflavin Propionic Acid Tetraester 2.65 g (7 mmols) of riboflavin, 3.4 g (35 mmols) of sodium propionate and 50 mL of propionic acid anhydride are weighed into a 100 ml round-bottomed flask. The mixture appears as a bright orange suspension. The flask is heated in an oil bath at 80-90° C., until a deep orange-red solution is obtained. The clear solution is then poured into an Erlenmayer flask containing approximately 200 ml of ice. The mixture is then neutralised using solid $NaHCO_3$ and then extracted with 3×100 mL of $CHCl_3$. The organic fractions are combined and dried over $MgSO_4$. The solvent is then evaporated under vacuum and a bright orange solid is obtained in all cases. The crude product is reconstituted in minimum amount of MeOH and then precipitated by addition of water.

B. Synthesis of Functional Monomers (Ex. 3)

Example 3

Synthesis of 2,4-bis(acrylamido)-6-piperidinopyrimidine and 2,4-bis(acrylamido)-4-ethoxypyrimidine The synthesis is performed in 2 steps:

(1a) Synthesis of 2,4-(diamino)-6-piperidinopyrimidine 2,4-(diamino)-6-piperidinopyrimidine is synthesised according to a published procedure by Roth et al. (ref: JACS, 72, 1924 (1950)). 14.48 g of 4-chloro-(2,6-diamino) pyrimidine and 50 mL of piperidine are mixed in a round-bottomed flask and stirred. The temperature is slowly increased up to 100° C. After 2½ hours at this temperature, 20 mL of ethanol is added to the flask and the resulting mixture is filtered. The precipitate is washed with 50 mL of ethanol. The filtrate is evaporated under vacuum and the solid residue is reconstituted in approximately 200 mL of water. The mixture is heated to 80° C. and then allowed to cool under vigorous stirring. 2,4-(diamino)-6-piperidinopyrimidine is obtained in the form of an off-white solid.

(1b) Synthesis of 2,4-diamino-6-ethoxypyrimidine 1.8 g of sodium is dissolved in 200 mL of ethanol, in a 250 mL round-bottomed flask, to form sodium ethoxide. 7.2 g of 4-chloro-(2,6-diamino) pyrimidine are then weighed into the round-bottomed flask. The mixture is refluxed for 7 days. After this period of time the solvent is evaporated under vacuum and 2,4-diamino-6-ethoxypyrimidine is obtained in the form of an off-white solid. No further purification is necessary.

(2a) Synthesis of 2,4-bis(acrylamido)-6-piperidinopyrimidine 2.05 g (10 mmols) of the product obtained by the procedure described in (1a) are reacted with 1.8 mL (2 equivalents) of acryloyl chloride in the presence of 4.2 mL of triethylamine in 100 mL of chloroform. The addition is performed dropwise and under cooling in an ice bath. After the addition is complete, the reaction mixture is stirred at room temperature for several hours. The solvent is evaporated under vacuum and then 100 mL of water are added to the solid residue to dissolve the hydrochloride salt of triethylamine (TEA.HCl). The mixture is then extracted with 3×100 mL $CHCl_3$, the organic phases are combined, dried over $MgSO_4$ and the solvent is finally evaporated in vacuo. The obtained solid compound was recrystallised from ethanol.

(2b) Synthesis of 2,4-bis(acrylamido)-6-ethoxypyrimidine 1.54 g (10 mmols) of the product obtained by the procedure described in (1b) are reacted with 1.8 mL of acryloyl chloride, in the presence of 4.2 mL of triethylamine in 100 mL of tetrahydrofuran. The addition is performed dropwise and under cooling in an ice bath. After the addition is complete, the reaction mixture is stirred at room temperature for several hours. The solvent is evaporated under vacuum and then 100 mL of water are added to the solid residue to dissolve the TEA.HCl salt. The mixture is then extracted with 3×100 mL $CHCl_3$, the organic phases are combined, dried over $MgSO_4$ and the solvent is finally evaporated in vacuo. A white solid is finally obtained and there is no need for further purification.

C. Synthesis of AquaMIPs (Ex. 4-7)

Example 4

Preparation of AquaMIPs using Riboflavin Tetraacetate as the Riboflavin Analogue and BAAPy as the Functional Monomer 0.22 g (1 mmol) of BAAPy are mixed with 0.55 g (1 mmol) of riboflavin tetraacetate in 5.6 mL of $CHCl_3$. Then 3.8 mL (20 mmols) of EDMA are added to the solution and finally 40 mg (1% wt of the monomers) of the azoinitiator, azobisisobutyronitrile (AIBN). The mixture is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath.

Example 5

Preparation of AquaMIPs using Riboflavin Tetraacetate as the Riboflavin Analogue and 2,4-bis(acrylamido)-6-piperidinopyrimidine as the Functional Monomer 0.3 g (1 mmol) of 2,6-bisacrylamido-4-(piperidino) pyrimidine are mixed with 0.55 g (1 mmol) of riboflavin tetraacetate in 5.6 mL of $CHCl_3$. Then 3.8 mL (20 mmols) of EDMA are added to the solution and finally 40 mg (1% wt of the monomers) of the azoinitiator AIBN. The mixture is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath.

Example 6

Preparation of AquaMIPs using 1-(benzyl)uracil as the Target and BAAPy as the Functional Monomer 0.22 g (1 mmol) BAAPy are mixed with 0.2 g (1 mmol) 1-(benzyl)uracil in 5.6 mL of $CHCl_3$. Then 3.8 mL (20 mmols) of EDMA are added to the solution and finally 40 mg (1% wt of the monomers) of the azoinitiator AIBN. The mixture is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath.

Example 7

Preparation of AquaMIPs using 1-(benzyluracil as the Target and 2,4-bis(acrylamido)-6-piperidino pyrimidine as the Functional Monomer 0.3 g (1 mmol) of 2,6-bisacrylamido-4-(piperidino)pyrimidine are mixed with 0.2 g (1 mmol) 1-(benzyl)uracil in 5.6 mL of $CHCl_3$. Then 3.8 mL (20 mmols) of EDMA are added to the solution and finally 40 mg (1% wt of the monomers) of the azo initiator AIBN. The mixture is transferred to a polymerisation tube, which is then sealed using flame burner. The polymerisation reaction is initiated thermally and allowed to polymerize at 60° C. for 24 h in a thermostatted water bath.

Example 8

Chromatographic Evaluation of the MIPs Described in Examples 4-7 for use as Selective Adsorbents After 24 h in the thermostated bath, a monolith is obtained in the polymerisation tube. The tube is smashed and the monolith is broken into smaller particles. These are then transferred to a paper thimble and placed in a Soxhlet extraction apparatus. The extracton is performed using MeOH as extraction solvent and lasts for 48 h. The material is then crushed using laboratory mortar and pestle and the resulting irregularly shaped particles are sieved between 25 μm and 50 μm. In order to remove the fine particles (<25 μm) that are contained in the 25-50 μm fraction, the material is then sedimented using a mixture of MeOH (80%) and water (20%) until the supernatant is clear. The particles are then packed into an HPLC column (125 mm×4 mm i.d.). The polymer described in example 4 shows a retention of riboflavin in 90% water (containing 5% ethanol) and 10% acetonitrile of 54 minutes whereas a non-imprinted polymer showed retention time of 6.4 minutes.

The polymer described in example 6 exhibited retention for 1-(benzyl)uracil in 100% acetonitrile of 34 minutes whereas the non-imprinted polymer retained 1-(benzyl)uracil for 2.7 minutes. Additionally, the polymer described in example 7, under the same conditions, retained 1-(benzyl)uracil for 54 minutes whereas the non-imprinted polymer retained 1-(benzyl)uracil for 3.2 minutes.

Example 9

Use of AquaMIPs for the Extraction of Riboflavin from Beer

The AquaMIP described in example 4 can selectively bind riboflavin from beer. Thus by equilibrating a 10 mL beer sample with 50 mg of polymer ca. 40% of riboflavin was adsorbed by the AquaMIP whereas ca 20% was adsorbed to a nonimprinted control polymer.

C. Synthesis of Molecularly Imprinted Polymers Showing Reduced Non-Specific Binding (Ex. 10-12)

Example 10

MIPs from Examples 4-7 but Prepared by Addition of a Hydrophilic Comonomer 0.22 g (1 mmol) of BAAPy is mixed with 0.55 g (1 mmol) of riboflavin tetraacetate in 5.6 mL of $CHCl_3$. Then 3.8 mL (20 mmols) of EDMA and 2 mL of 2-hydroxyethylmethacrylate (HEMA) are added to the solution. Finally, 40 mg (1% wt of the monomers) of the azo initiator AIBN are dissolved in the above mixture. The solution is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath.

Example 11

Preparation of MIPs using Riboflavin Tetraacetate as the Riboflavin Analogue and BAAPy as the Functional Monomer together with a Hydrophilic Crosslinking Monomer 0.22 g (1 mmol) of BAAPy is mixed with 0.55 g (1 mmol) of riboflavin tetraacetate in 5.6 mL of $CHCl_3$. Then 20 mmols of pentaerythritoltriacrylate are added to the solution and finally 40 mg (1% wt of the monomers) of the azo initiator AIBN. The mixture is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath. After polymerisation the polymer is worked up as described in example 8. The resulting polymer exhibits greatly reduced non-specific binding compared to the polymers described in examples 4 and 5.

Example 12

Preparation of Imprinted Polymers using Riboflavin Tetraacetate as the Riboflavin Analogue and BAAPy as the Functional Monomer together with Hydrolysable Crosslinking Monomer and Post-Modification by Base Hydrolysis 0.22 g (1 mmol) of BAAPy is mixed with 0.55 g (1 mmol) of riboflavin tetraacetate in 5.6 mL of $CHCl_3$. Then 20 mmols of pentaerythritoltriacrylate mono(2-chloroacetate) are added to the solution and finally 40 mg (1% wt of the monomers) of the azoinitiator AIBN. The mixture is transferred to a polymerisation tube, purged with $N_2$ for 10 minutes and finally the tube is sealed using a flame burner. The polymerisation reaction is initiated thermally and allowed to polymerize at 60° C. for 24 h in a thermostatted water bath. After polymerisation and work up as described in example 8, the polymer particles are suspended and stirred in a solution of tetrabutylammonium hydroxide (or longer chain quartenary ammonium hydroxide) in methanol for 24 hours at elevated temperature. The resulting polymer exhibits greatly reduced non-specific binding compared to the polymers described in examples 4 and 5.

The invention claimed is:

1. A method of obtaining a water compatible molecularly imprinted polymer, comprising the steps:

(a) providing a target or a template, or a structural analogue thereof, (b) providing one or more selected functional monomer(s) and one or more selected crosslinking agent(s), in a suitable polymerisation medium or solvent containing a selected free radical initiator, (c) copolymerising said functional monomer(s) and said crosslinking agent(s) in the presence of said target, template or structural analogue in said polymerisation medium, (d) removing said target, template or structural analogue by solvent extraction or by photochemical means, (e) obtaining a molecularly imprinted polymer (Aqua-MIP), wherein hydrophilic comonomer(s), different from the functional monomer, are provided with the functional monomer, and/or said crosslinking agent(s) is hydrophilic; and (f) post-modifying, by hydrolysis, said water compatible molecularly imprinted polymer in order to reduce the non-specific hydrophobic binding.

2. The method of claim 1, wherein the template is an imide-containing template or structural analogue thereof.

3. The method according to claim 2, wherein said imide-containing template is selected from the group consisting of benzyluracil and riboflavin, and analogues thereof.

4. The method according to claim 2, wherein the structural analogue of riboflavin used is a riboflavin tetra-carboxylic acid ester.

5. The method according to claim 1, wherein the hydrophilic comonomer is selected from the group consisting of 2-hydroxyethylmethacrylate, N-vinylpyrrolidone, acrylamide, methacrylamide, glycerol-1-methacrylate, and glycerol-1-acrylate.

6. The method according to claim 1, wherein the hydrophilic crosslinking monomer is selected from the group consisting of pentaerythritoltriacrylate (PETRA), methylenediacrylamide and ethylenedimethacrylamide.

7. The method according to claim 3, wherein the riboflavin tetra-carboxylic acid esters are selected from the group consisting of riboflavin acetic acid tetraesters, riboflavin propionic acid tetraesters and riboflavin formic acid tetraesters.

8. The method according to claim 1, wherein tetraalkylammonium hydroxide (QOH) is used in the post-modifying step.

9. The method according to claim 1, wherein the functional monomer is a pyridine-based monomer or a pyrimidine-based monomer.

10. The method according to claim 1, wherein the functional monomer is a pyridine-based monomer selected from 2,6-bis(acrylamido)pyridine.

11. The method according to claim 1, wherein the functional monomer is a pyrimidine-based monomer of the general Formula I (I)

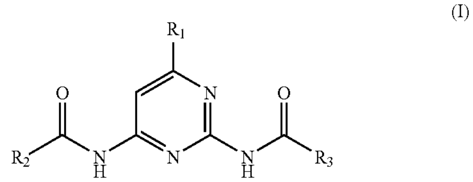

wherein $R_1$ is selected from the group consisting of H, piperidino, and $C_2$-$_{10}$-alkoxy, and $R_2$ and $R_3$ are each independently a polymerisable group.

12. The method according to claim 11, wherein $R_2$ and $R_3$ are independently selected from the group consisting of $—CH═CH_2$ and $—C(CH_3)═CH_2$.

* * * * *

UNITED STATES PATENT AND TRADEMARK OFFICE

CERTIFICATE OF CORRECTION

PATENT NO. : 7,750,090 B2
APPLICATION NO. : 10/543775
DATED : July 6, 2010
INVENTOR(S) : Borje Sellergren et al.

It is certified that error appears in the above-identified patent and that said Letters Patent is hereby corrected as shown below:

On the title page, please amend item (54) to read as follows:

-- (54) MOLECULARY IMPRINTED POLYMERS FOR EXTRACTION OF COMPONENTS FROM FOODSTUFFS --

Signed and Sealed this

Fourteenth Day of September, 2010

David J. Kappos
*Director of the United States Patent and Trademark Office*

UNITED STATES PATENT AND TRADEMARK OFFICE

CERTIFICATE OF CORRECTION

PATENT NO. : 7,750,090 B2
APPLICATION NO. : 10/543775
DATED : July 6, 2010
INVENTOR(S) : Borje Sellergren et al.

It is certified that error appears in the above-identified patent and that said Letters Patent is hereby corrected as shown below:

On the title page, please amend item (54) and at Column 1, lines 1-3, title, to read as follows:

-- MOLECULARY IMPRINTED POLYMERS FOR EXTRACTION OF COMPONENTS FROM FOODSTUFFS --

This certificate supersedes the Certificate of Correction issued September 14, 2010.

Signed and Sealed this

Second Day of November, 2010

David J. Kappos
*Director of the United States Patent and Trademark Office*